United States Patent
Albasheir et al.

(10) Patent No.: US 11,546,821 B2
(45) Date of Patent: Jan. 3, 2023

(54) METHODS AND SYSTEMS FOR SELECTING A GATEWAY NODE TO SUPPORT HANDOVER IN A WIRELESS COMMUNICATION NETWORK

(71) Applicant: T-Mobile USA, Inc., Bellevue, WA (US)

(72) Inventors: Suliman Albasheir, Sammamish, WA (US); Muhammad Waqar Afzal, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 14 days.

(21) Appl. No.: 17/210,868

(22) Filed: Mar. 24, 2021

(65) Prior Publication Data

US 2022/0312293 A1  Sep. 29, 2022

(51) Int. Cl.
*H04W 36/32* (2009.01)
*H04W 36/00* (2009.01)
*H04W 36/24* (2009.01)

(52) U.S. Cl.
CPC ....... *H04W 36/32* (2013.01); *H04W 36/0022* (2013.01); *H04W 36/0061* (2013.01); *H04W 36/245* (2013.01)

(58) Field of Classification Search
CPC ............. H04W 36/32; H04W 36/0022; H04W 36/0061; H04W 36/245
USPC .............................................. 455/4, 43
See application file for complete search history.

(56) References Cited

U.S. PATENT DOCUMENTS

| | | | | |
|---|---|---|---|---|
| 9,338,700 | B2* | 5/2016 | Schulist | H04W 36/0022 |
| 11,317,457 | B1* | 4/2022 | Marupaduga | H04W 76/10 |
| 2017/0094574 | A1* | 3/2017 | Singh | H04W 36/245 |
| 2019/0089841 | A1* | 3/2019 | Jeong | H04W 48/18 |
| 2021/0258845 | A1* | 8/2021 | Otaka | H04W 36/32 |

* cited by examiner

*Primary Examiner* — Charles N Appiah
*Assistant Examiner* — Frank E Donado
(74) *Attorney, Agent, or Firm* — Loeb & Loeb LLP

(57) ABSTRACT

A method for selecting a gateway node to support handover when a user equipment (UE) attaches to a 4G long-term evolution (LTE) network may include receiving a prediction from a machine learning engine predicting whether the UE is more likely to handover between the 4G LTE network and a 3G network or between the 4G LTE network and a 5G network based on handover data in the UE's location area. The method may further include selecting a first gateway node if the prediction indicates that the UE is more likely to handover between the 4G LTE network and the 3G network, and selecting a second gateway node if the prediction indicates that the UE is more likely to handover between the 4G LTE network and a 5G network. The first gateway node may support 4G and 3G sessions, and the second gateway node may support 4G and 5G sessions.

19 Claims, 7 Drawing Sheets

METHODS AND SYSTEMS FOR SELECTING A GATEWAY NODE TO SUPPORT HANDOVER IN A WIRELESS COMMUNICATION NETWORK

TECHNICAL FIELD

Embodiments discussed herein generally relate to methods and systems for selecting a gateway node to support handover in a user equipment (UE) upon attachment of the UE to a wireless communication network.

BACKGROUND

Handover is a process in which a voice or data session is transferred from a serving base station to another base station to provide continuous service when the user's device reaches an edge of a cell range. A handover decision may be made when the received signal from the serving base station falls below a threshold and the signal from a nearby base station rises above a threshold. Depending on network coverage, handover may occur between the same radio technology (e.g., 4G to 4G, 3G to 3G, etc.) or between different generations of radio technologies (e.g, 3G to 4G, 4G to 5G, etc.). For a favorable user experience, the handover should be seamless without a perceivable disruption in the connection.

In a 4G long-term evolution (LTE) network with control and user plane separation, a packet data network gateway control plane function (PGW-C) may control the point of attachment to a data network. The mobility management entity (MME) may select between different PGW-C nodes when the user device attaches to the 4G LTE network, with one PGW-C node supporting both 4G and 3G and another PGW-C node supporting 4G and 5G. However, there is currently no gateway function that supports 3G, 4G, and 5G sessions and handover from 3G to 4G to 5G (and vice versa). Thus, if the MME selects the gateway function supporting 4G and 5G sessions (the 5G gateway), the user device will disconnect from the network and reconnect via the other gateway function if the user device attempts to handover from 4G to 3G. Likewise, if the MME selects the gateway function supporting 4G and 3G sessions, the user device will disconnect from the network and reconnect via the 5G gateway if the user device attempts to handover from 4G to 5G. For example, the MME may select the 5G gateway function if the user device is a 5G handset, even if the user's location is an area with poor 5G coverage and many of the user devices in the area are handing over to a 3G network. Consequently, handovers at the user device to the 3G network will fail if the 5G gateway is selected, leading to call or session disconnections during handover and a poor user experience.

As 5G and 3G network coverage may vary in a location over time, particularly with the deployment of 5G, there is a need for more intelligent and dynamic selection of the PGW-C node at the MME for supporting handover and improving user experience. The present disclosure provides a technical solution for this need.

SUMMARY

Embodiments disclosed herein provide a technical solution to the problem of session disconnections and reconnections that may occur during handover if the selected gateway node (PGW-C node) does not support the type of handover (e.g., 4G to 3G handover or 4G to 5G handover). In one embodiment, a computer-implemented method for selecting a gateway node when a user equipment (UE) attaches to a 4G long-term evolution (LTE) network may include receiving an attach request from a base station in the 4G LTE network when the UE connects to the base station, determining a location area of the UE, and predicting whether the UE is more likely to handover between the 4G LTE network and a 3G network or between the 4G LTE network and a 5G network based on historical handover data for the location area. If the UE is predicted to be more likely to handover between the 4G LTE network and the 3G network, the method may include selecting a first gateway node on the 4G LTE network that supports both 4G and 3G sessions. If the UE is predicted to be more likely to handover between the 4G LTE network and the 5G network, the method may include selecting a second gateway node on the 4G LTE network that supports both 4G and 5G sessions. Additionally, the method may further include sending a session request to the selected first or second gateway node for connecting the UE to a data network.

In another embodiment, a system may include a user equipment (UE), a 3G network, a 5G network, and a 4G long-term evolution (LTE) network. The 4G LTE network may include a radio access network having a base station and an evolved packet core including a mobility management entity (MME). The MME may include a computer system having a processor, a memory, and an input-output circuit. The processor may be configured according to computer-executable instructions for receiving an attach request from the base station when the UE attempts to attach to the 4G LTE network, and receiving a prediction from a machine learning (ML) engine predicting whether the UE is more likely to handover between the 4G LTE network and the 3G network or between the 4G LTE network and the 5G network. The processor may be further configured according to computer-executable instructions for selecting a first gateway node that supports handovers between the 4G LTE network and the 3G network if the UE is predicted to be more likely to handover between the 4G LTE network and the 3G network, selecting a second gateway node that supports handovers between the 4G LTE network and the 5G network if the UE is predicted to be more likely to handover between the 4G LTE network and the 5G network, and sending a session request to the selected first or second gateway node.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
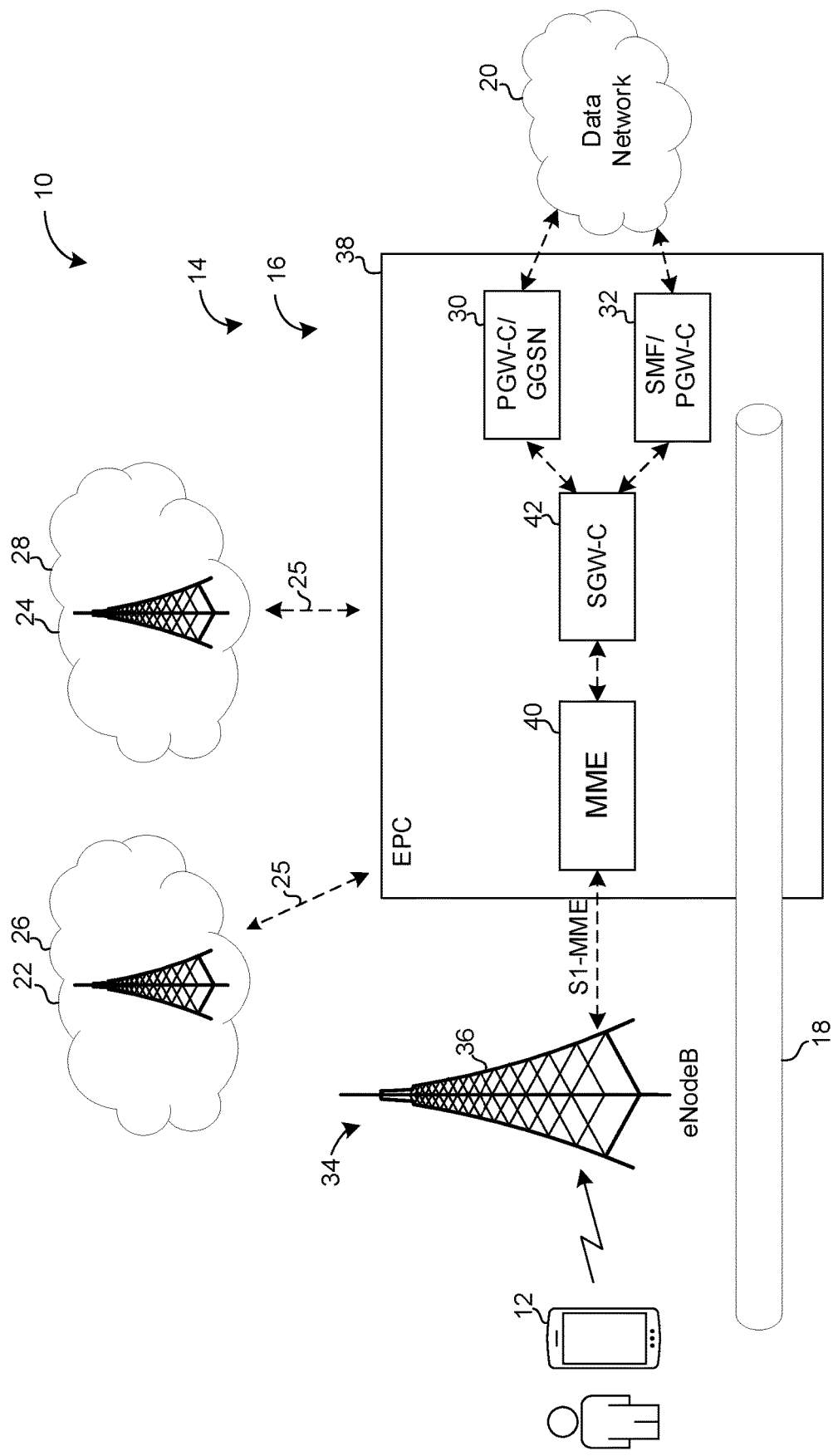
FIG. 1 is a schematic representation of a system for selecting a gateway node for supporting handover when a user equipment (UE) attaches to a wireless communication network, according to one embodiment.

Referring now to the drawings and with specific reference to FIG. 1, a system 10 for selecting a gateway node for supporting handover when a user equipment (UE) 12 attaches to a wireless communication network 14 is shown. In the exemplary embodiment of FIG. 1, the wireless communication network 14 is a 4G long-term evolution (LTE) wireless communication network 16. Upon attachment to the network 16, an evolved packet system (EPS) bearer 18 is established to allow the UE 12 to send and receive data to and from a data network 20, such as the Internet or an IP multimedia subsystem (IMS). The system 10 may include the UE 12, the wireless communication network 14, at least one first network 22 of a different radio technology generation than the wireless communication network 14, and at least one second network 24 of a different radio technology generation than the wireless communication network 14. The first and second networks 22 and 24 are networks available for handover 25 with the wireless communication network 14. In one embodiment, the first network 22 is a 3G network 26 available for handover with the 4G LTE network 16, and the second network 24 is a 5G network 28 available for handover with the 4G LTE network 16. A first gateway node 30 may support handover between the wireless communication network 14 and the first network 22, and a second gateway node 32 may support handover between the wireless communication network 14 and the second network 24.

If the network 14 is a 4G LTE network 16, it may include a radio access network (RAN) 34 having one or more base stations (eNodeBs) 36, and an evolved packet core (EPC) 38 which communicates with the data network 20. In addition to other components not shown in FIG. 1 for clarity, the EPC 38 may include a mobility management entity (MME) 40, a serving gateway control plane function (SGW-C) 42, and the first gateway node 30 and the second gateway node 32 which control the connection of the UE 12 to the data network 20 for the life of the EPS bearer 18. The first gateway node 30 may support 4G and 3G sessions and handover 25 between the 4G LTE network 16 and the 3G network 26, whereas the second gateway node 32 may support 4G and 5G sessions and handover 25 between the 4G LTE network 16 and the 5G network 28. As explained in detail below, the MME 40 may intelligently select between one of the first gateway node 30 and the second gateway node 32 for creation of the EPS bearer 18 to support seamless handover for the UE 12 and minimize any session disconnections during handover.

In the embodiment of FIG. 1, the first gateway node 30 may include a packet data network gateway control plane function (PGW-C) co-located with a gateway general packet radio service (GPRS) support node (GGSN) which is a 3G function associated with the 3G network 26. Accordingly, if the MME 40 selects the first gateway node 30 for attachment, there will be no disconnection in the UE session if handover between the 4G network 16 and the 3G network 16 takes place. However, a session disconnection will occur if handover between the 4G network 16 and the 5G network 28 takes place as the first gateway node 30 does not support 5G sessions. In this situation, the MME 40 may reconnect to the second gateway node 32 to allow handover to the 5G network 28.

The second gateway node 32 may include the PGW-C co-located with a session management function (SMF) node which is a 5G function associated with the 5G network 28. Thus, if the MME 40 selects the second gateway node 32 for attachment, there will be no disconnection in the UE session if handover between the 4G network 16 and the 5G network 28 takes place. There will, however, be disconnection and reconnection to the first gateway node 30 if handover between the 4G network 16 and the 3G network 26 takes place.

Figure 2:
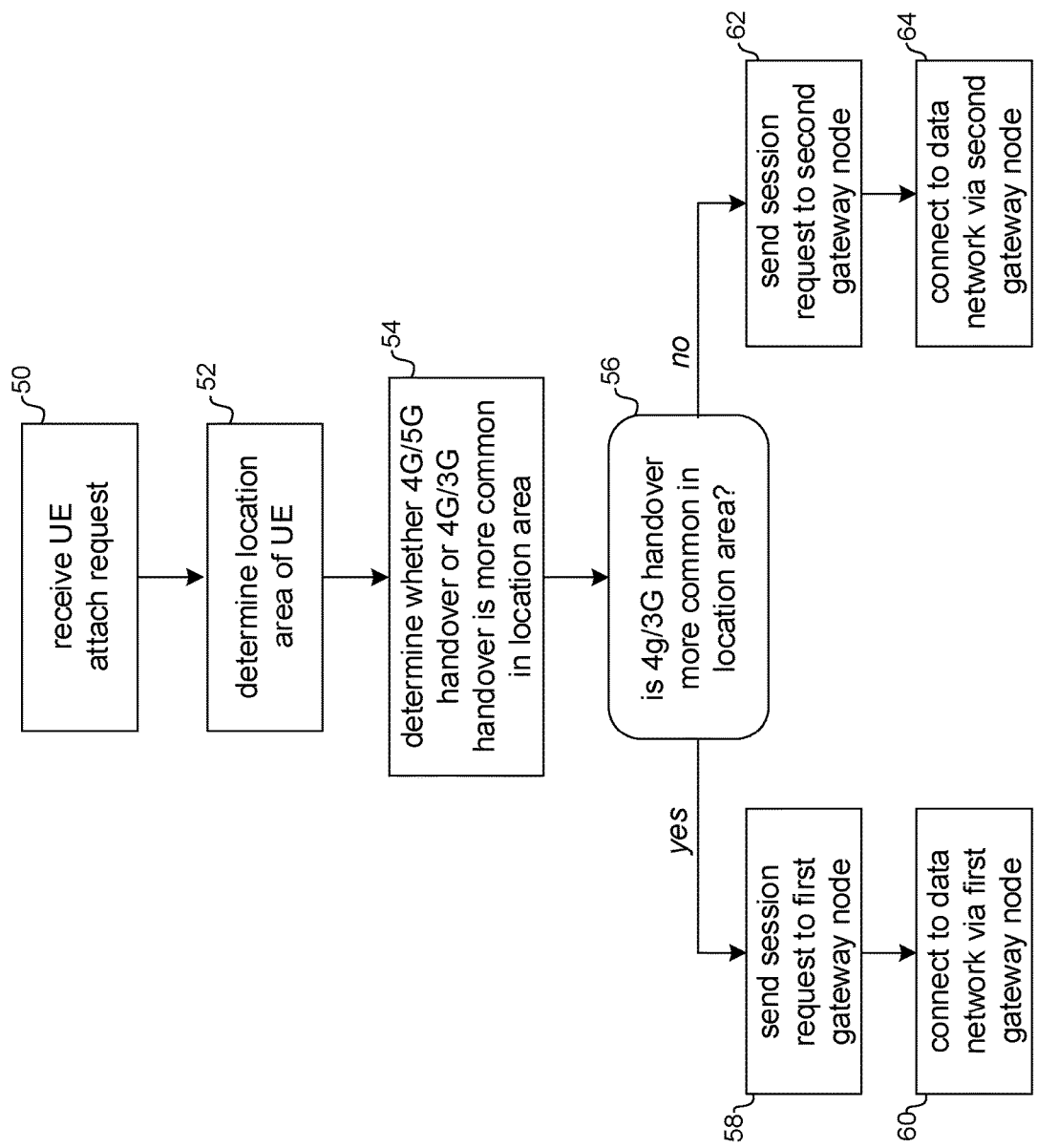
FIG. 2 is a flow chart illustrating an exemplary computer-implemented method for selecting the gateway node for supporting handover when the UE attaches to the wireless communication network, according to one embodiment.

Turning to FIG. 2, a method for selecting the gateway node 30 or 32 when the UE 12 attaches to the 4G LTE network 16 is shown. In this embodiment, the first network 22 is the 3G network 26 and the second network 24 is the 5G network 28. The method may be performed by a computer system 44 of the MME 40 (also see FIG. 5). At a first block 50, the MME 40 may receive an attach request from the eNodeB 36 over the S1-MME interface when the UE 12 connects to the eNodeB 36. The MME 40 may then determine the location area of the UE 12 at a block 52. In one embodiment, the location area of the UE 12 may be defined according to a cell or cell sector identification (ID) of a cell or cell sector location of the UE 12. In another embodiment, the location area of the UE 12 may be defined according to a tracking area code (TAC) defining a tracking area, or a group of cells, where the UE 12 is located. The location area of the UE 12 (cell ID or TAC) may be derived from information in the attach request from the eNodeB 36.

At a following block 54, the MME 40 may evaluate handover data for the location area to determine whether handover between 4G and 5G or between 4G and 3G is more prevalent in the location area. The handover data may include prior handover data for the UE 12, as well as other UEs 12 in the location area of the same or different device type. The MME 40 may access the handover data locally such as through one or more databases 46 of the MME 40 (also see FIG. 5). The block 54 may involve evaluating the handover data based on various parameters in addition to the location of the UE 12, such as time, date, and the type of device of the UE 12. For instance, the MME 40 may review the handover data and determine that, historically, there has been more handover between 4G and 3G than between 4G and 5G in the location area of the UE 12 for the particular device type of the UE 12. In one embodiment discussed more specifically below with reference to FIGS. 3-7, the MME 40 may apply a machine learning (ML) engine 48 (also see FIG. 5) to learn the handover trends in the location area as the handover trends change over time, and make a prediction as to whether handover between 4G and 3G handover or handover between 4G and 5G is more likely for the UE 12.

If handover between the 4G network 16 and the 3G network 26 is more common in the location area (as assessed at decision block 56), the MME 40 may select the first gateway node 30 supporting 4G and 3G sessions for attachment, and send a session request to the first gateway node 30 (block 58). If the first gateway node 30 accepts the request, the EPS bearer 18 may be established allowing the UE 12 to send and receive data to and from the data network 20 via the first gateway node 30 (block 60). Alternatively, if handover between the 4G network 16 and the 5G network 28 is more common in the location area (as assessed at decision block 56), the MME 40 may select the second gateway node 32 supporting 4G and 5G sessions for attachment, and send a session request to the second gateway node 32 (block 62). If the second gateway node 32 accepts the request, the EPS bearer 18 may be established, connecting the UE 16 to the data network 20 via the second gateway node 32 (block 64). By selecting the gateway node that supports the more likely type of handover that the UE 12 will undergo, the MME 40 minimizes the chances that a session will be disconnected and reconnected during handover.

Figure 3:
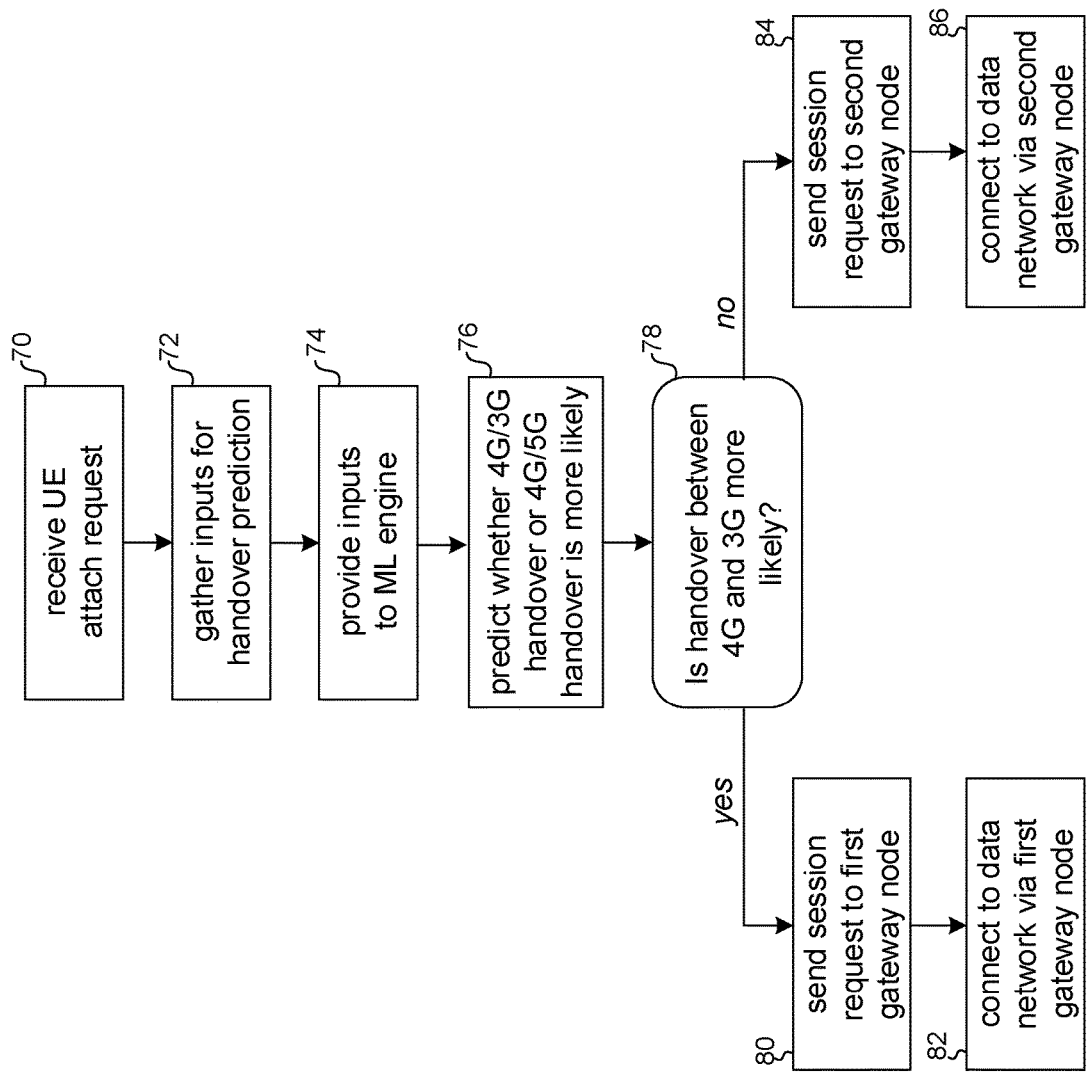
FIG. 3 is a flow chart of another exemplary computer-implemented method for selecting the gateway node for supporting handover when the UE attaches to the wireless communication network, according to another embodiment.

A method for selecting the gateway node for supporting handover that relies on machine learning is shown in FIG. 3. In this arrangement, the computer system 44 of the MME 40 may include or may be associated with the ML engine 48 (also see FIG. 5). The ML engine 48 may be trained to predict the more likely type of handover for the UE 12 based on previous handover data and trends which may change dynamically over time. At a first block 70, the computer system 44 may receive an attach request from the eNodeB 36 when the UE 12 connects to the eNodeB 36. At a next block 72, the computer system 44 may gather inputs for the ML engine 48 to make the handover prediction. The inputs to the ML engine 48 may at least include the location area of the UE 12 which may be based on cell or cell sector ID, or TAC. Additional inputs may include, but are not limited to, the device type of the UE 12, for example whether the device is a 5G handset, the time of day, and/or the calendar date. The computer system 44 may provide the inputs to the ML engine 48 at a block 74. Based on the provided inputs, the trained ML engine 48 may run a prediction algorithm to provide a prediction of whether handover between 4G and 3G or between 4G and 5G is more likely for the UE 12 in its particular location area (block 76).

If the ML engine 48 predicts that the UE 12 is more likely to handover between 4G and 3G (as assessed at a block 78), the computer system 44 may select the first gateway node 30 for the attachment, and may send a session request to the first gateway node 30 (block 80). If the session request is accepted by the first gateway node 30, the UE 12 may be connected to the data network 20 via the first gateway node 30 (block 82). Alternatively, if the ML engine 48 predicts that the UE 12 is more likely to handover between 4G and 5G (as assessed at the block 78), the computer system 44 may send a session request to the second gateway node 32 (block 84), and the UE 12 may be connected to the data network 20 via the second gateway node 32 if the session request is accepted (block 86). An advantage of the method of FIG. 3 is that the prediction capability of the ML engine 48 is continually improved and refined as new handover data is continually generated over time, and accounts for any changes in handover trends for certain location areas, device types, times, dates, and/or other attributes. The addition of the ML engine 48 instills an active intelligence into the MME 40 for making its selection of the appropriate gateway node for UE attachment.

Figure 4:
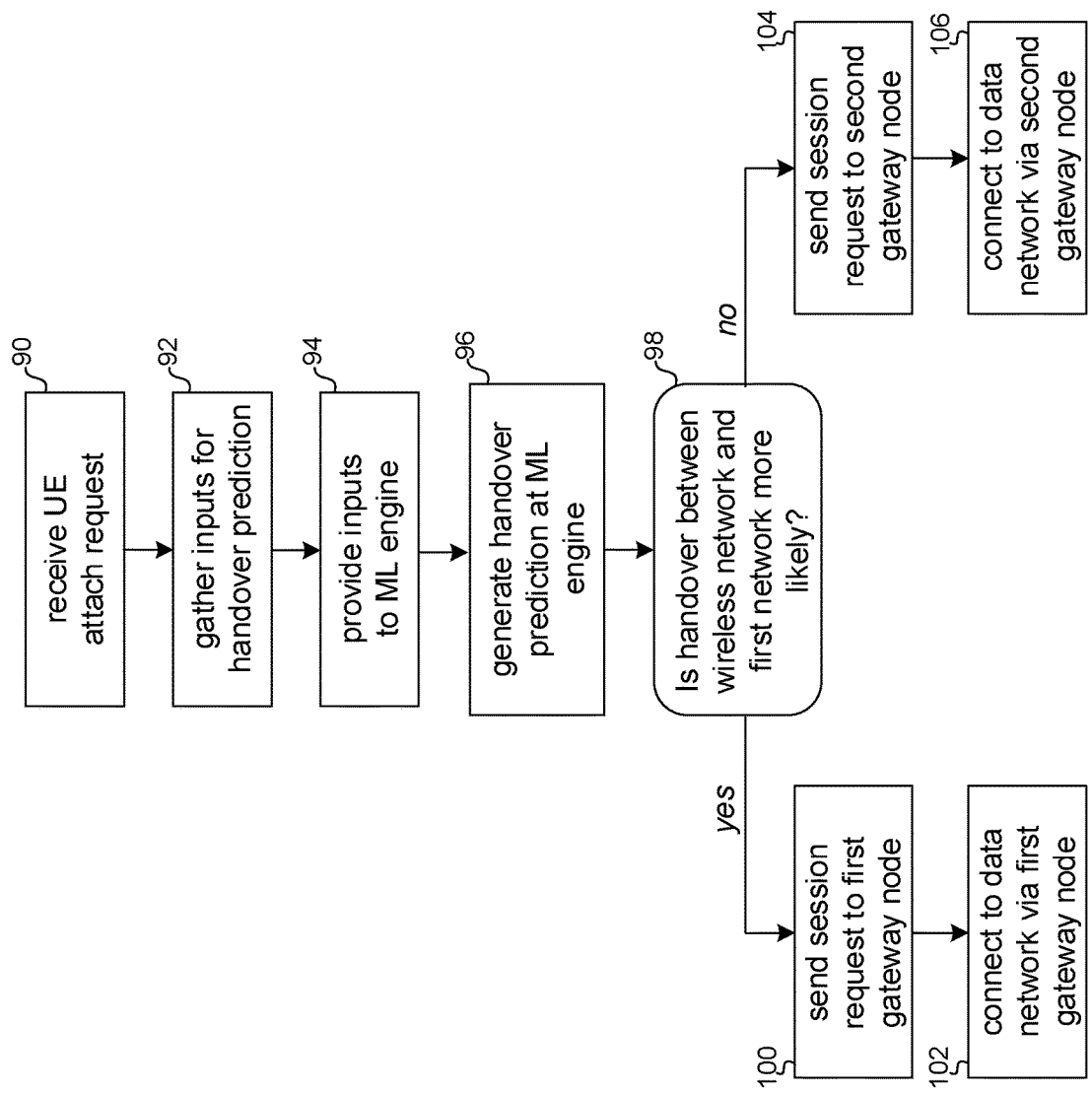
FIG. 4 is a flow chart of another exemplary computer-implemented method for selecting a gateway node for supporting handover when the UE attaches to the wireless communication network, according to another embodiment.

Another exemplary method for selecting a gateway node for supporting handover when the UE 12 attaches to the wireless communication network 14 is shown in FIG. 4. In the embodiment of FIG. 4, the wireless communication network 14 is not limited to a 4G LTE network, and the first and second networks 22 and 24 available for handover with the wireless communication network 14 are not limited to a 3G network and a 5G network, respectively. The method of FIG. 4 may be performed by a computer system 44 of the MME 40, if applicable, or a computer system 44 of another network entity or function of the network 14. At a first block 90, the computer system 44 may receive an attach request from the base station 36 when the UE 12 attempts to attach to the network 14. At a block 92, the computer system 44 may gather inputs for handover prediction by the ML engine 48 including the location area, and other optional inputs such as the device type, the time, and the calendar date. These inputs may be provided to the ML engine 48 at a block 94. Based on its training with historical handover data at the location area of the UE 12, the ML engine 48 may generate the handover prediction at a block 96 with the handover prediction indicating whether the UE 12 is more likely to handover to the first network 22 or the second network 24.

If handover between the wireless communication network 14 and the first network 22 is predicted to be more likely for the UE 12 (as assessed at a block 98), the computer system 44 may send a session request to the first gateway node 30 to connect the UE 12 to the data network 22 via the first gateway node 30 (blocks 100 and 102). If handover between the wireless communication network 14 and the second network 24 is predicted to be more likely (as assessed at a block 98), the computer system 44 may send a session request to the second gateway node 32 to connect the UE 12 to the data network 20 via the second gateway node 32 (blocks 104 and 106).

Figure 5:
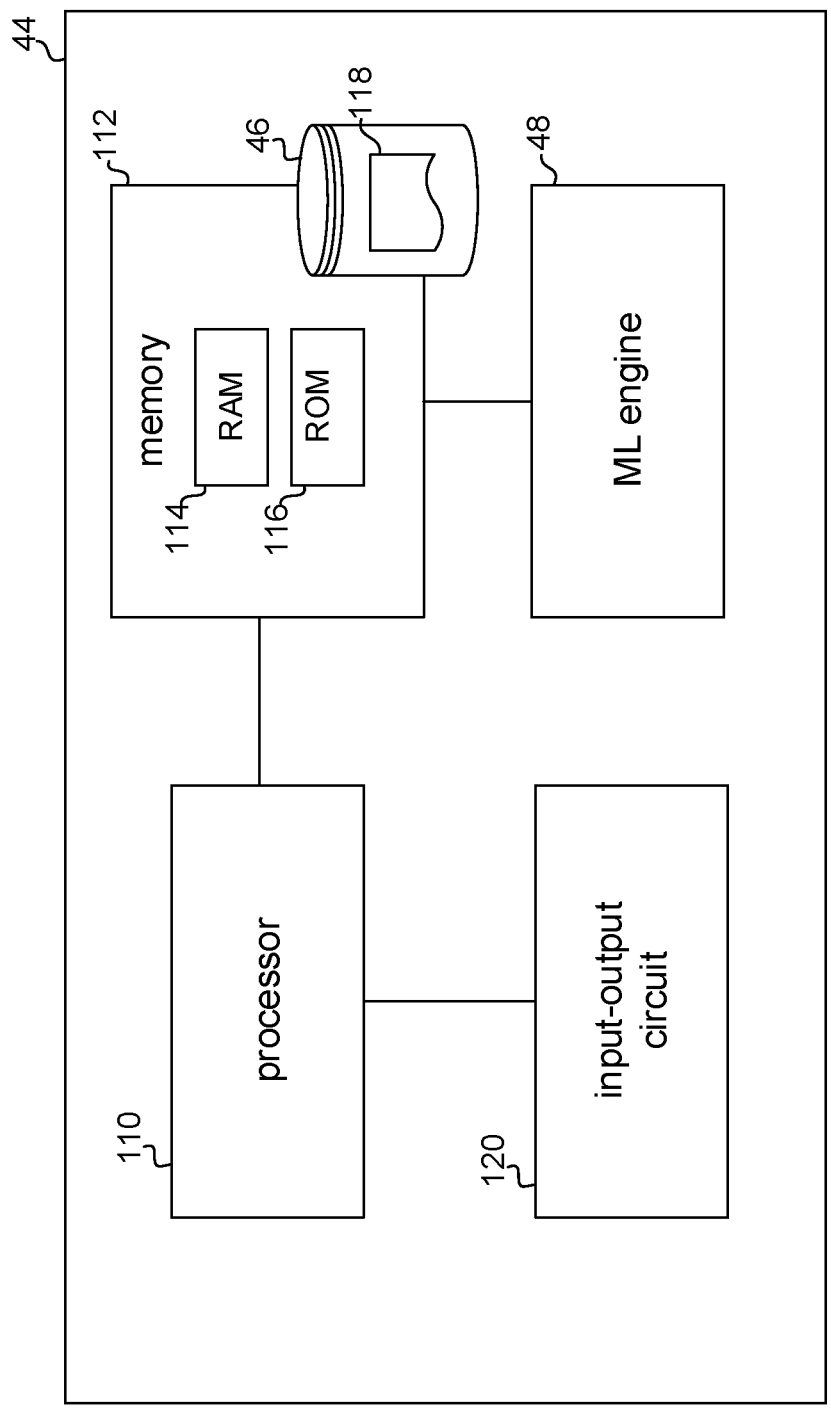
FIG. 5 is a schematic representation of certain elements of a computer system of the wireless communication network involved in selecting the gateway node, according to one embodiment.

The computer system 44 involved in intelligent selection of the gateway node is schematically shown in FIG. 5. In one embodiment, the computer system 44 is a computer system of the MME 40. The computer system 44 may include one or more processors 110 configured according to computer-executable instructions, and a memory 112 configured to store the computer-executable instructions and assist the processor 110. The memory 112 may include a random access memory (RAM) 114, or volatile memory for temporary storage, and a read-only memory (ROM) 116, or non-volatile memory for permanent storage. One or more databases 46 may be associated with the memory 112 which stores historical handover data 118 that is used for selecting the gateway node and training the ML engine 48. In other embodiments, the database(s) storing the historical handover data may be associated with another node or computer system of the network 14. The computer system 44 may further include the ML engine 48 which collects the historical handover data 118 from the database 46 for training. In other embodiments, the ML engine 48 may be located at a separate node or computer system of the network 14. An input-output circuit 120 of the computer system 44 may enable the computer system 44 to communicate with other entities of the system 10, such as the eNodeB 36, the SGW-C 42, and the gateway nodes 30 and 32.

Figure 6:
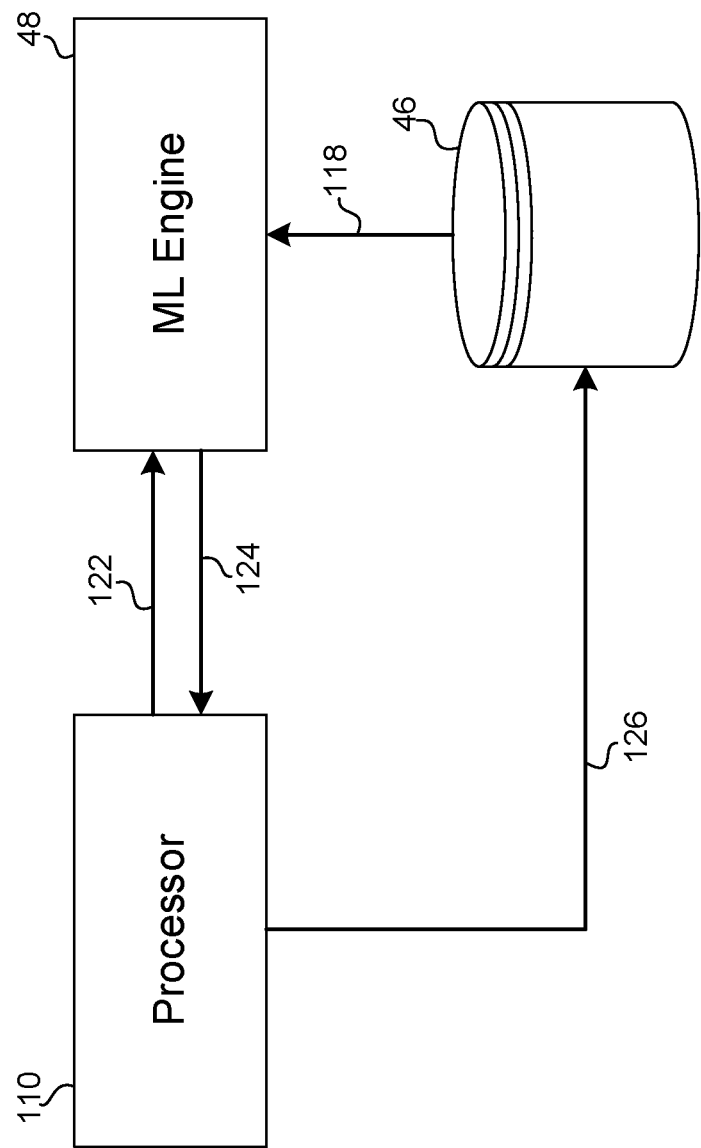
FIG. 6 is a schematic representation of interactions between the elements of the computer system FIG. 5, according to one embodiment.

Turning to FIG. 6, certain interactions between elements of the computer system 44 involved in making the handover prediction are shown. The ML engine 48 may gather the handover data 118 from the database 46 used for training as well as creation and refinement of the handover prediction model. The handover data 118 may include past handover data for different UEs in the network 14 such as the number of handovers between 4G and 3G, the number of handovers between 4G and 5G, and different attributes associated with each of the handovers including, but not limited to, the location area of the handover (based on cell ID or TAC), the time of the handover, the calendar date of the handover, and the device type of the UE involved in the handover.

The processor 110 may provide input data 122 to the ML engine 48 when the UE 12 attempts to attach to the network 14. As explained above, these inputs may include at least the location area of the UE 12, and additional inputs such as the device type, the time, and/or the calendar date. Applying the input data 122 to the prediction model, the ML engine 48 may provide an output 124 of the handover prediction to the processor 110 which the processor 110 uses to select the appropriate gateway node 30 or 32. Once the gateway node 30 or 32 is selected and the UE 12 is attached to the network 14, the processor 110 may collect new handover data 126 for the user sessions and store the handover data 126 at the database 46. This new handover data 126 may be supplied to the ML engine 46 as training data 118 for continuous refinement of the handover prediction model. In other embodiments, the processor 110 may directly supply the data 126 to the ML engine 48 as the data is generated at each UE 12.

Figure 7:
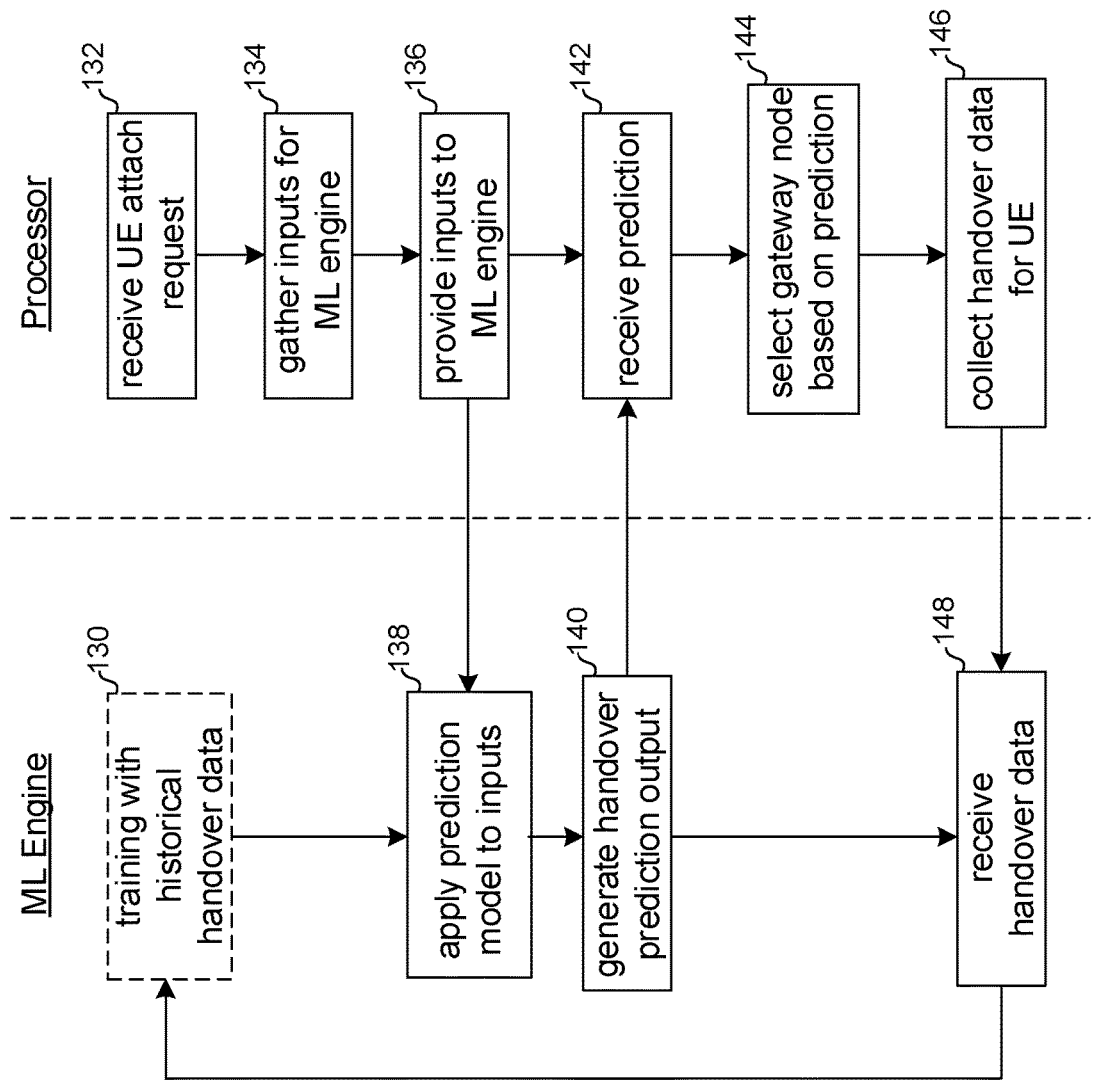
FIG. 7 is a flow chart illustrating an exemplary method of applying a machine learning (ML) engine associated with the computer system to generate a handover prediction for the UE, according to one embodiment.

Application of the ML engine 48 to provide the handover prediction is described more specifically with reference to FIG. 7. The method of FIG. 7 is organized into steps performed at the ML engine 48 and those performed at the processor 110. At a block 130, the ML engine 48 may be trained with historical handover data 118 which may include target attributes (e.g., whether the handover was between 4G and 3G or between 4G and 5G) and corresponding input data attributes surrounding each target attribute (e.g., location area, device type, time of day, calendar date, etc.). In some embodiments, the input data attributes may also include network coverage data (e.g., signal strength of the 3G, 4G, and/or 5G network) in the location area of where the handovers occurred, as these characteristics may change over time and influence the type of handover in different locations. The block 130 may involve splitting the historical handover data 118 into a training data set and a test data set, creating the prediction model based on the training data set, validating the prediction model using the test data set, and further refining the prediction model if the prediction model does not accurately predict the type of handovers (e.g., between 4G and 3G or between 4G and 5G) based on the input data attributes in the test data.

When the UE attach request is received at the processor 110 (block 132), the processor 110 may gather and provide the input data 122 to the ML engine 48 (blocks 134 and 136). The ML engine 48 may apply the prediction model to the input data (block 138) to generate the handover prediction output 124 for the UE 12 (block 140). Upon receipt of the handover prediction (block 142), the processor 110 may select the corresponding gateway node 30 or 32 based on the prediction (block 144). Once the UE 12 is attached to the network 14, the processor 110 may collect the new handover data 126 for the UE 12 (block 146). Upon receipt of the new handover data via the processor 110 or the database 46 (block 148), the ML engine 48 may apply the handover data for continual training and refinement of the handover prediction model (block 130). The ML engine 48 may be continually updated in this way with handover data from other UEs of the network 14 as well. In another embodiment, the ML engine 48 may be trained based on handover data of the specific UE 12 only to make a handover prediction for the specific UE 12.

As is encompassed by the embodiment of FIG. 4, the concepts of the present disclosure may be extended to include handovers involving cellular network generations that are not yet developed. In such situations, the decision maker as to which gateway node to select may be the MME computer system or a computer system associated with another network function, depending on the architecture of the network that the UE attaches to. Furthermore, it will be understood that the order of the steps of FIGS. 2-4 and 7 is exemplary, and that some of the steps may be carried out in different orders or simultaneously in practice.

The present disclosure provides a technical solution to the problem of session disconnections/reconnections that may occur during a handover if a gateway node that does not support the handover is selected. In the 4G LTE network, new functions are introduced at the MME computer system that provide the MME with the ability to intelligently select the PGW-C gateway node that will minimize the chances of session disconnection/reconnection during handovers. Based on handover data in the location area of the UE which indicates which type of handover (e.g., between 4G and 3G or between 4G and 5G) is more common in the location area, and how the type of handover varies depending on different characteristics such as the device type and time, the MME selects the PGW-C gateway node that supports the type of handover that is predicted to be more likely for the UE. By applying machine learning, the prediction may be continuously refined and change dynamically as handover statistics in the UE's location area change and as network coverage in the area changes. This may be particularly beneficial, for example, with the deployment of 5G and changing 5G network coverage in different locations. By reducing the likelihood of undesirable session disconnections/reconnections during handover, users will have an better experience and the function of the network as a whole may be improved.

What is claimed is:

1. A computer-implemented method for selecting a gateway node when a user equipment (UE) attaches to a 4G long-term evolution (LTE) network, wherein the method is performed by a computer system of a mobility management entity (MME) of the 4G LTE network, the method comprising:

receiving an attach request from a base station in the 4G LTE network when the UE connects to the base station;
determining a location area of the UE;
based on historical handover data for the location area, predicting whether the UE is more likely to handover between the 4G LTE network and a 3G network or between the 4G LTE network and a 5G network;
selecting a first gateway node on the 4G LTE network that supports both 4G and 3G sessions when the UE is predicted to be more likely to handover between the 4G LTE network and the 3G network;
selecting a second gateway node on the 4G LTE network that supports both 4G and 5G sessions when the UE is predicted to be more likely to handover between the 4G LTE network and the 5G network; and
sending a session request to the selected first or second gateway node for connecting the UE to a data network.

2. The computer-implemented method of claim 1, wherein the location area is defined according a cell identification (ID) number of a cell or cell sector of the location area of the UE.

3. The computer-implemented method of claim 1, wherein the location area is defined according to a tracking area code (TAC) of a tracking area of the UE.

4. The computer-implemented method of claim 1, wherein predicting whether the UE is more likely to handover between the 4G LTE network and the 3G network or between the 4G LTE network and the 5G network includes applying a machine learning engine to make the prediction.

5. The computer-implemented method of claim 4, wherein predicting whether the UE is more likely to handover between the 4G LTE network and the 3G network or between the 4G LTE network and the 5G network includes:

providing input data to the machine learning engine, the input data at least including the location area of the UE; and applying the machine learning engine to generate the prediction based on the input data.

6. The computer-implemented method of claim 5, wherein the input data further includes a device type of the UE.

7. The computer-implemented method of claim 1, wherein the first gateway node is a co-located packet data network gateway control (PGW-C) node and a gateway GPRS support node (GGSN).

8. The computer-implemented method of claim 7, wherein the second gateway node is a co-located session management function (SMF) node and a PGW-C node.

9. A system, comprising:
a user equipment (UE);
a 3G network;
a 5G network; and
a 4G long-term evolution (LTE) network including a radio access network having a base station and a evolved packet core including a mobility management entity (MME), the MME including a computer system having a processor, a memory, and an input-output circuit, the processor being configured according to computer-executable instructions for:
receiving an attach request from the base station when the UE attempts to attach to the 4G LTE network,
receiving a prediction from a machine learning (ML) engine predicting whether the UE is more likely to handover between the 4G LTE network and the 3G network or between the 4G LTE network and the 5G network,
selecting a first gateway node that supports handovers between the 4G LTE network and the 3G network when the UE is predicted to be more likely to handover between the 4G LTE network and the 3G network,
selecting a second gateway node that supports handovers between the 4G LTE network and the 5G network when the UE is predicted to be more likely to handover between the 4G LTE network and the 5G network, and
sending a session request to the selected first or second gateway node.

10. The system of claim 9, wherein the MME includes the ML engine.

11. The system of claim 10, wherein the ML engine makes the prediction based on trends in historical handover data for a location area of the UE.

12. The system of claim 11, wherein the ML engine accesses the historical handover data from one or more databases of the MME.

13. The system of claim 11, wherein the location area of the UE is defined based on a cell identification (ID) number of a cell or cell sector of the UE.

14. The system of claim 11, wherein the location area of the UE is defined based on a tracking area code (TAC) of a tracking area of the UE.

15. The system of claim 9, wherein the ML engine is separate from the MME.

16. The system of claim 9, wherein the first gateway node is a co-located packet data network gateway control (PGW-C) node of the 4G LTE network and a gateway GPRS support node (GGSN) of the 3G network.

17. The system of claim 9, wherein the second gateway node is a co-located packet data network gateway control function (PGW-C) node of the 4G LTE network and a session management function (SMF) node of the 5G network.

18. A computer-implemented method for selecting a gateway node to support handover when a user equipment (UE) attaches to a wireless communication network, wherein the method is performed by a computer system of a mobility management entity (MME) of the wireless communication network, the method comprising:
receiving an attach request from a base station in the wireless communication network when the UE connects to the base station;
determining a location area of the UE;
applying a machine learning (ML) engine to predict, based at least on historical handover data for the location area, whether the UE is more likely to handover to a first network of a different radio technology generation than the wireless communication network or to a second network of a different radio technology generation than the wireless communication network;
selecting a first gateway node on the wireless communication network that supports handover between the wireless communication network and the first network when the UE is predicted to be more likely to handover to the first network;
selecting a second gateway node on the wireless communication network that supports handover between the wireless communication network and the second network when the UE is predicted to be more likely to handover to the second network; and
sending a session request to the selected first or second gateway node for connecting the UE to a data network.

19. The computer-implemented method of claim 18, further comprising training the ML engine using historical handover data for the wireless communication network.

* * * * *